J. F. KAUFMAN.
COLOR INDICATING CHART.
APPLICATION FILED SEPT. 4, 1918.
1,351,661.
Patented Aug. 31, 1920.
3 SHEETS—SHEET 1.
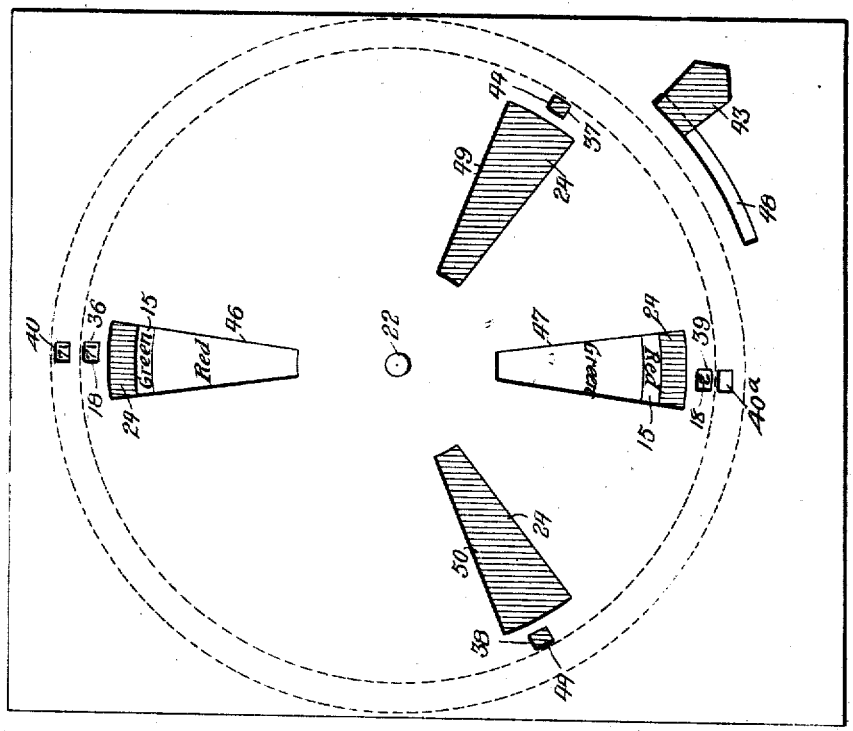
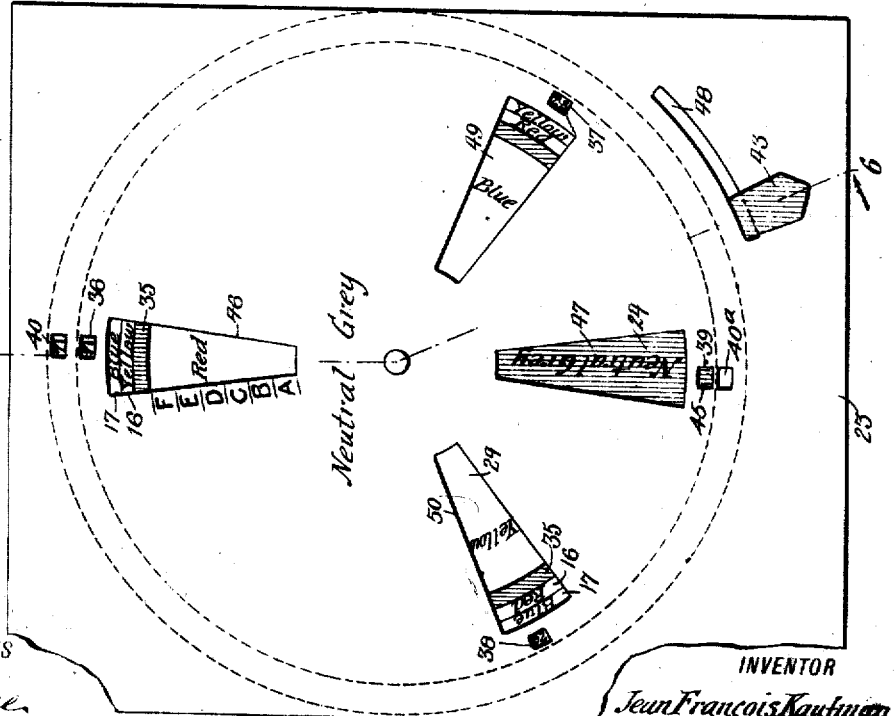
WITNESSES
INVENTOR
Jean François Kaufman
BY
ATTORNEY J. F. KAUFMAN.
COLOR INDICATING CHART.
APPLICATION FILED SEPT. 4, 1918.
1,351,661. Patented Aug. 31, 1920.
3 SHEETS—SHEET 2.
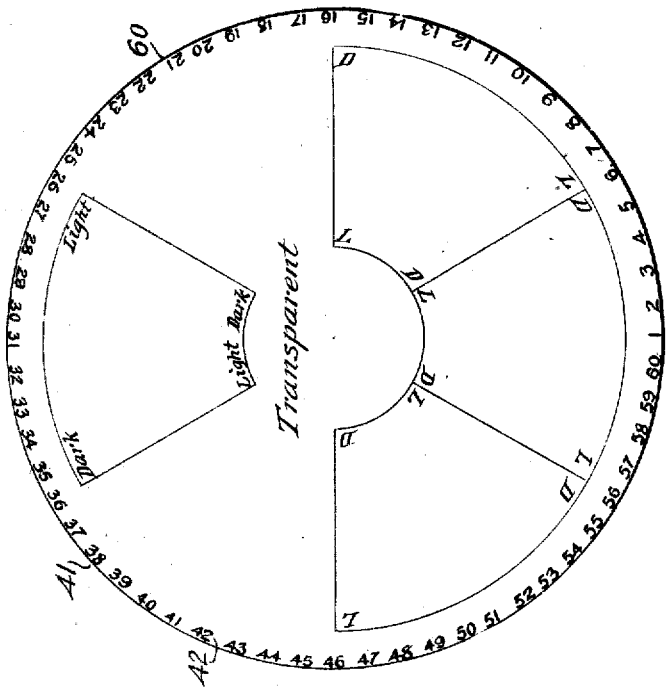
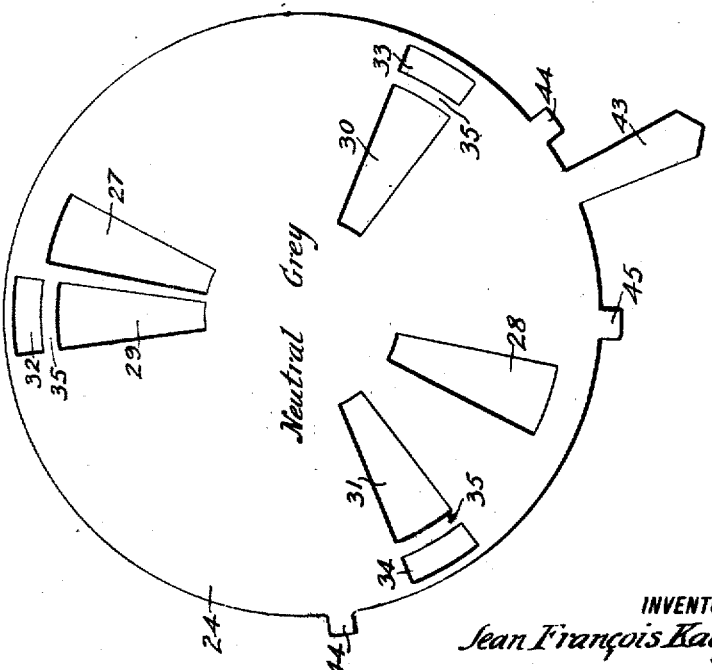

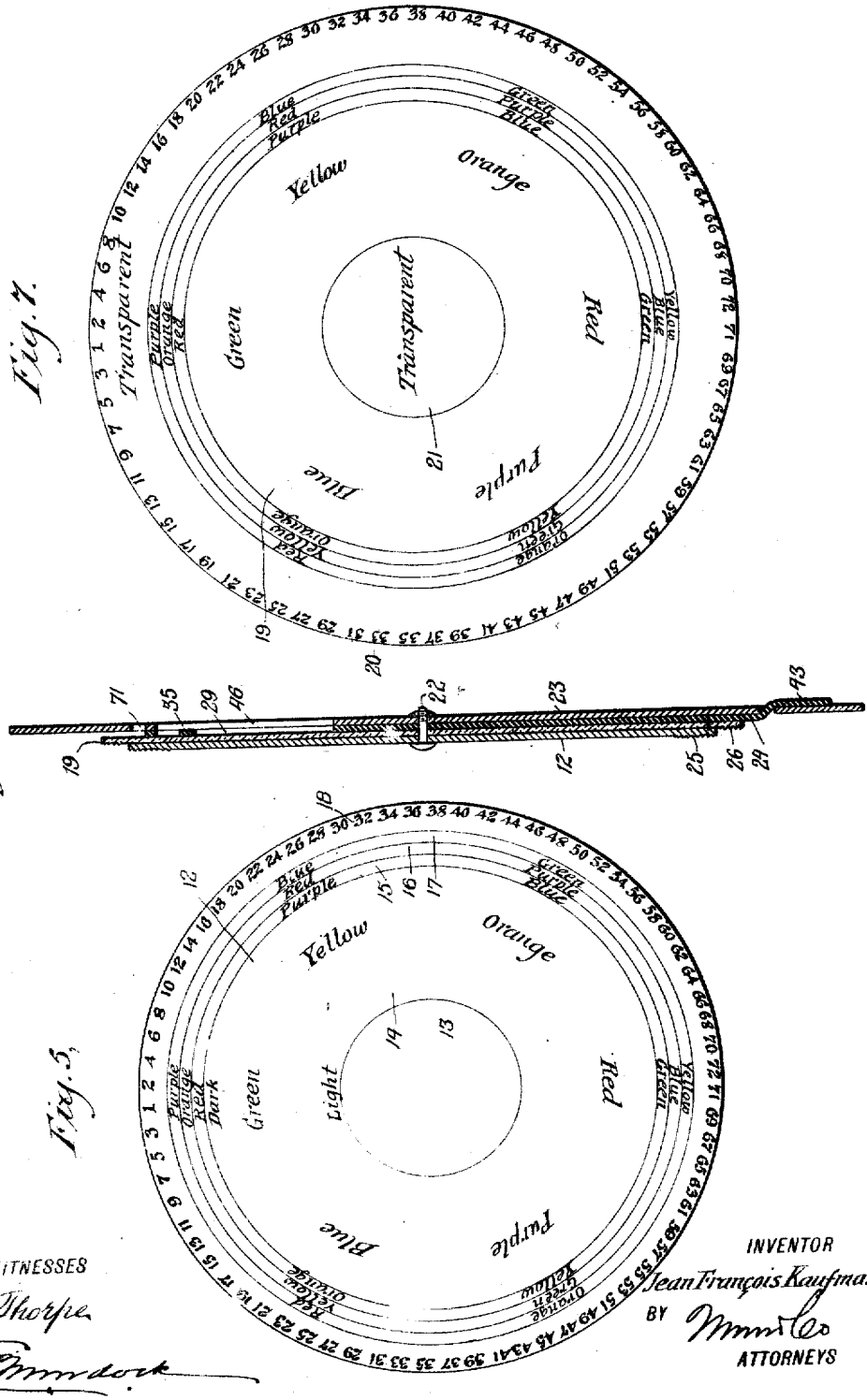

UNITED STATES PATENT OFFICE.

JEAN FRANÇOIS KAUFMAN, OF NEW YORK, N. Y.

COLOR-INDICATING CHART.

1,351,661.       Specification of Letters Patent.   Patented Aug. 31, 1920.

Application filed September 4, 1918. Serial No. 252,619.

*To all whom it may concern:*

Be it known that I, JEAN FRANÇOIS KAUFMAN, a citizen of the United States, and a resident of the city of New York, borough of Manhattan, in the county of New York and State of New York, have invented a new and Improved Color-Indicating Chart, of which the following is a full, clear, and exact description.

Among the principal objects which the present invention has in view are,—to quickly ascertain the colors which harmonize; to ascertain the colors which harmonize by contrast or by combination; to vary the harmonizing colors correspondingly; to register the colors employed for identification; to shade and tint key and coördinate colors correspondingly; and to mechanically ascertain from a given key any of the color harmonies desired.

Drawings.

Figure 1 is a face view showing an indicating chart of the character mentioned constructed and arranged in accordance with the present invention, the chart being arranged to show a key for two harmonizing colors and a tri-color harmony.

Fig. 2 is a similar view showing the chart arranged for a two-color harmony.

Fig. 3 is a face view of a cover disk employed in the present invention.

Fig. 4 is a translucent shade screen for varying the color tone.

Fig. 5 is a disk showing an arrangement of primary key colors and the numbers assigned thereto.

Fig. 6 is a cross section of the indicating chart assembled.

Fig. 7 is a face view of a color-tinting screen employed in the present invention.

Description.

As seen best in Fig. 5 of the drawings, a circular disk 12, constructed of any suitable material such as cardboard, celluloid, or metal, has imprinted or overlaid thereon colors, preferably the key prismatic colors. These colors are arranged about the center space 13, and, as shown in Fig. 5, they are arranged as yellow, red, blue, disposed triangularly about the said space 13. The gradient colors resulting from combining any two of the primary colors are placed in the space between such colors as would be combined. Thus between the colors blue and yellow, evenly spaced from each, is placed green; between yellow and red is placed orange; while between red and blue the resultant color purple is disposed. The space 14 in which the said colors are disposed encircles the space 13 and extends to the color bands 15, 16 and 17. These bands have imprinted thereon in spaces corresponding with the spaces having the primary and gradient colors, colors harmonizing with the key color to which they relate. The colors of the bands 15, 16 and 17 are associated with reference to the body colors on the disk 12, so that the colors of the band 15 are disposed in diametrically opposite arrangement to the body colors from which they are taken. Thus by reference to Fig. 5, it will be seen that the colors of the band 15 are each removed 180° from its corresponding color. That is to say, the green on the band 15 is 180° removed on the disk from the green on the body of the disk, and is disposed in approximate relation to the color red. Likewise the yellow of the band 15 is disposed 180° from the yellow of the body of the disk and is approximated to the body color purple. Thus whenever the band 15 is exposed, a body color, green, yellow, orange, red, purple, or blue, will be exposed in conjunction with and approximate to their respective complementaries, such as red on green, purple on yellow, blue on orange, green on red, yellow on purple, and orange on blue. A similar correspondence exists for the gradient colors, such as greenish yellow or yellowish green, yellowish orange or orange yellow, &c.

It will be understood that the color bands may be of any width and that the colors thereof are identical with or correspond to the colors of the body. That is to say, the green of the bands is the same as the green of the body color.

The bands 16 and 17 are arranged with reference to the body colors to be exposed on the chart in triangular arrangement and the colors of the two bands bear the same relation to the body color with which they are associated as the complementary colors on the body of the disk. That is to say, the complementary colors on the disk, blue, yellow and red, are disposed at 120° apart, or in triangular arrangement. The blends of these colors are similarly arranged. The color of the bands 16 are moved from the body color with which they are identified in like manner, to wit, 120°. Thus from the body color purple, the purple of the band 17 is moved 120°. The colors on the band 16 are moved 120° in the reverse direction. The result of this arrangement is that with each of the colors on the body color, there are associated two colors, which if mingled, would form a/ complementary to the body color. These two colors, however, with the body color, form a perfect tri-color harmony.

By the expression "key color" as used herein is meant the color for which the color or dominant tone for the various correspondences or harmonies is sought. Thus, in Figs. 1 and 2 it will be seen that the key color is that exposed in the opening 46 at the top of each of said figures of the drawing, and is the same in both figures though the harmony colors differ, owing to the fact that the harmony in the one instance is a triple combination while in the other instance it consists of a double combination.

The colors placed on the disk 12 are shaded from dark to light, as indicated by the words "Dark" and "Light", in Fig. 5, the word "Dark" being adjacent the band 15 at the outer edge of the space 14, while the word "Light" is adjacent the circular space 13. Also, the colors are gradually shaded through the intermediate space, said colors being combined; thus, green and yellow are mixed, starting from a dark green at a line intermediate the space developed to the colors blue and green, and shaded gradually toward the yellow until the pure yellow opposite the yellow is obtained, or, in other words, the three primaries, yellow, red and blue, are successively mixed to produce intermediate the said colors in the order named, orange, purple, and green, with gradual degrees of intensity of the said colors. The various tints thus produced are shaded front dark to light from the band 15 to the space 13. By this arrangement I obtain the primary colors, their secondary colors with intermediate tints, and a full gamut of shades thereof.

Around the outer edges of the disks 12 and 19, are provided scales 18 and 20 or numerals for identifying the tints of the various primary, secondary and intermediate colors. In practice, the disk 12 is covered by the tinting disk 19, best seen in Figs. 6 and 7 of the drawings. As indicated in Fig. 7, the disk 19 is constructed of transparent material, such as glass or celluloid, the latter being preferred. The colors indicated on the disk 19 are duplicates of those shown on the disk 12, the arrangement and the blend of the colors being the same. A distinction, however, is made. The colors employed on the disk 19 are transparent, their office being to tint, and by counter-reflection, intensify the colors on the disk 12, and not to replace the same. The disk 19 has the scale 20 and a transparent inner area 21. The scale 20 corresponds with the scale 18 of the disk 12.

Both disks 12 and 19 are pivotally mounted by means of a bolt 22 on a cover plate 23. Intermediate the disk 19 and the cover plate 23 is a shutter disk 24 also pivotally mounted on the bolt 22, the function whereof is herein described.

The disks 12 and 19 are each movable independently of the other and both independently of the disk 24. To this end, both of the said disks are preferably furnished with roughened areas 25 and 26, respectively, said areas being immediately adjacent the perimeters of the said disks.

The shutter disk 24 is best seen in Fig. 3 of the drawings, where it will be observed that it is provided with view openings 27 and 28 oppositely disposed and in paired arrangement. Other view openings 29, 30 and 31 are disposed in triangular relation. Associated with the triple openings 29, 30 and 31 are auxiliary openings 32, 33 and 34, respectively. The openings 32, 33 and 34 coincide with the bands 16 and 17, the band 15 being obscured by the strips 35 which separate the auxiliary openings from the triple openings.

It will be noted by reference to Figs. 1 and 2 that the cover plate 23 has a series of view openings 36, 37, 38, 39, 40 and 40ª. The numbers 36 to 39 correspond in position with the scale 18, while the numbers 40 and 40ª correspond in position with the scales 20 and 41 on the tinting disk 19 and on the shaded disk 42. As seen by reference to Figs. 1 and 2, when the handle 43 is moved to the left, the numbers of the scale 18 are exposed through the view openings 36, 37 and 38. When the handle 43 is moved to the right, as seen in Fig. 2, the numbers of the scale 18 are exposed through the view openings 36 and 39. The tabs 44 have been moved into register with the openings 37 and 38, while the tab 45, which in the former position registered with the opening 39, is now moved away from the opening 39 to expose a numeral of the scale 18 formerly thereunder. The numerals in the scales 20 and 41 are always exposed at the openings 40 and 40ª, the disks having these scales being moved independently to modify the colors designated by the numerals of the scale 18.

The disk 42 has a series of transparent and tinted or shaped areas. In Fig. 4 of the drawings, the tinted or shaped areas are shown as sectors of the disk having boundaries, the corners of each of the sectors being indicated by the characters L D adjacent the curved boundary near the center of the disk, and by the characters D L at the relatively opposite corners of the areas or adjacent the curved boundary near the edge of the disk. The characters "D" and "L" are used to indicate dark and light of the shade or tint. These disks are preferably made from celluloid or other transparent or translucent material, and the color or tint placed thereon is preferably translucent so that the body colors of the disk 12 may show through the color or colors on the areas. These colors may be prismatic or, if desired, may have a single tone or shade, such as brown or black. The colors thus employed may be used to raise or lower the key or tint of the colors on the disk 12. The arrangement of dark and light is arbitrary, and may be varied to suit the taste or wishes of the manufacturer or user, and may be largely varied to give the desired results.

It is understood that the disks 19 and 42 are interchangeable, or, if desired, they may be used together. Preferably, however, they are interchangeable, as the disk 42 is provided with areas shaded diagonally from dark to dark and from light to light to produce the various effects on the colors of the disk 12 in correspondence with the shade.

When using a chart constructed and arranged as described, the following method is employed: The operator holding the chart and cover plate 23 thereof in his hands, engages the roughened surfaces 25 and 26 of the disks 12 and 19. He then moves the disk 19 until a color transparent portion thereof registers with the view opening 46 in the said cover plate. The view openings 27 and 29 are at the time disposed in register with the view opening 46, so that the color disk 12 is plainly viewed therethrough. The disk 12 is then moved by the operator until the key color desired by him shows through the opening 46. If the color selected is a primary or a secondary color, the disk 19 or 42 is moved in position where a transparent section thereof is registered with the opening 46.

If, now, the operator desires a color harmony of a two-color type, he moves the handle 43 to the right, as shown in Fig. 2. This adjusts the disk 24 so that the openings 27 and 28 register with the openings 46 and 47 in the cover plate. It will be found that the key color is now offset by the complementary thereof, or, in other words, if the key color selected when the shutter disk 24 is moved as described, is red, the other color exposed is green or the complement of red.

If a triple harmony is desired, the handle 43 is moved to the left of the slot 48 with the result that openings 29, 30 and 31 are brought in register with openings 46, 49 and 50 in the cover plate. It will then be found that the three primary colors are exposed. That is, if red has been selected, the other colors showing through the openings 49 and 50 will be blue and yellow respectively. It is evident that if instead of red the operator had selected a secondary, such as green, then the three secondaries will appear.

It is evident that if different harmonies of primary and secondary colors or gradients thereof are selected these may be varied by movement of the disks 19 and 42. The former will vary colors of the disk 12 by the addition of transparent colors on the disk, while the same colors would be varied by the use of the disk 42 to shade the colors on the disk 12.

It will be observed that in the movements of the disks 12 and 42 the numerals on the scales 18 and 41 will show through the openings 36, 37, 38 and 40. If a person has the harmony shown in Fig. 1, he informs a correspondent that the harmony is produced by colors 71, 23 and 26. If the harmony shown in Fig. 2 is desired, his information would be to the effect that the harmony consists of colors 71 and 2. If the position of the disk 42 is that shown in Fig. 1, he indicates by stating that the shade disk is moved to No. 1. It is evident that exact information as to colors needed can be thus transmitted from one mind to another.

*Claims.*

1. A color-indicating chart comprising a disk having a series of areas triangularly arranged, said areas having applied thereto the three primary colors and blends of the adjacent colors graded through the intervening areas, a cover plate for said chart having view openings therein triangularly disposed for exposing said colors, and a movable shutter adapted to expose and close said openings.

2. A color-indicating chart comprising a movable color disk, said disk having radially disposed thereon color areas chromatically arranged, a cover plate therefor, said plate having two series of view openings therein, one series being disposed on the same diameter, and one series being disposed on triangularly arranged radials, both series incorporating one of said openings, and a shutter disk movably disposed, said shutter disk having two distinct series of openings, one series corresponding with the two openings in said cover plate, and the other series corresponding with the three openings in said cover plate, the two series of openings in said shutter disk being independent each of the other to avoid correspondence of said openings.

3. A color-indicating chart comprising a disk having a series of areas triangularly arranged, said areas having applied thereto the three primary colors and blends of the adjacent colors graded through the intervening areas, a cover plate for said chart having triangularly disposed view openings therein for exposing said colors, a movable shutter adapted to expose and close said openings, and a movable tint-graded, translucent member for varying the colors on said disk.

4. A color-indicating chart comprising a disk having a series of areas triangularly arranged, said areas having applied thereto the three primary colors and blends of the adjacent colors graded through the intervening areas, a cover plate for said chart having triangularly disposed view openings therein for exposing said colors, a movable shutter adapted to expose and close said openings, and means mounted on said disk for identifying the colors and radiants thereof.

5. A color-indicating chart comprising a disk having a series of areas triangularly arranged, said areas having applied thereto the three primary colors and blends of the adjacent colors graded through the intervening areas, a cover plate for said chart having triangularly disposed view openings therein for exposing said colors, a movable shutter adapted to expose and close said openings, means mounted on said disk for identifying the colors and radiants thereof, and means provided on said shutter for exposing said indicating means in correspondence with the exposed color and radiants thereof.

6. A color-indicating chart comprising a movable color disk, said disk having radially disposed thereon color areas chromatically arranged, a cover plate therefor, said plate having two series of view openings therein, one series being disposed on the same diameter, and one series being disposed on triangularly arranged radials, both series incorporating one of said openings, a shutter disk movably disposed, said shutter disk having two distinct series of openings, one series corresponding with the two openings in said cover plate, and the other series corresponding with the three openings in said cover plate, the two series of openings in said shutter disk being independent each of the other to avoid correspondence of said openings, and means for shifting said shutter relative to said color areas, said means embodying a handle extending from said shutter for engagement by an operator.

7. A color indicating chart comprising a disk having six outward flared areas, the centers of which are disposed at 60° apart, all of said areas being provided with three primary colors merging to produce a blend from adjacent primary colors, bands disposed circumferentially to said areas, one or more of said bands carrying the complementary color for each of said areas with which they are associated, and the remaining pair or pairs of bands carrying each the colors of the blends of complementary color harmony with which they are associated and adjacent blends of said trial color combination, the colors of said bands and the color of said area constituting a harmonious arrangement.

8. A color indicating chart comprising a disk having applied thereto colors chromatically and radially disposed, with adjacent colors merging at the line of juncture thereof and a series of distinct bands with the colors thereon arranged 120° and also 180° from the respective first mentioned colors.

9. A color indicating chart comprising a disk having applied thereto colors chromatically and radially disposed, with the edges of adjacent colors merging so that adjacent colors will merge from a full shade of one color to a full shade of another color, and a series of bands with the same colors thereon as the first mentioned colors positioned so that the colors on said bands will be arranged at 120° and also 180° from the similar first mentioned color, the respective colors on said bands merging at the point of juncture, a translucent disk provided with a color arrangement identical with the color arrangement of the first mentioned disk, and means for disclosing a radial line of said colors arranged at 180° or arranged at 120° from a similar color on said circle.

JEAN FRANÇOIS KAUFMAN.